United States Patent [19]

Akamatsu et al.

[11] Patent Number: 5,799,757
[45] Date of Patent: Sep. 1, 1998

[54] BRAKE DEVICE

[75] Inventors: Osamu Akamatsu, Akashi; Yoshio Asano, Kobe; Toshiyuki Matsuoka, Miki, all of Japan

[73] Assignee: Nabco Ltd., Kobe, Japan

[21] Appl. No.: 594,517

[22] Filed: Jan. 31, 1996

[30] Foreign Application Priority Data

Feb. 27, 1995 [JP] Japan ................... 7-064857

[51] Int. Cl.⁶ ......................................... F16D 51/00
[52] U.S. Cl. ............................... 188/76; 188/74
[58] Field of Search ................. 188/74, 76, 3 R, 188/153 R, 156, 153 A, 166, 167, 197; 74/25–27; 192/3.51

[56] References Cited

U.S. PATENT DOCUMENTS 3,331,474  7/1967  Day ............................... 188/76
4,039,052  8/1977  Murphy ......................... 188/76

FOREIGN PATENT DOCUMENTS 2266130  10/1997  Japan ............................ 188/76

*Primary Examiner*—Robert J. Oberleitner
*Assistant Examiner*—C. T. Bartz
*Attorney, Agent, or Firm*—James Ray & Associates

[57] ABSTRACT

The invention is one which provides in a brake device possessing an energy production unit, a force transmission unit which receives the drive force of the energy production unit and produces outputs by advancing and retreating, and a clutch unit which is provided between the energy production unit and the force transmission unit and maintains the advance and retreat positions of the energy force unit when outputs are produced, a guide structure which allows displacement of the force transmission unit and of the brake shoe in an advance and retreat direction relative to the force transmission unit. A buffer unit is provided in the guide structure which urges the force transmission unit and the brake shoe in separate directions and which, on transmission of a reaction force greater than the maximum output of the force transmission unit, allows the brake shoe to move in the advance and retreat directions.

20 Claims, 4 Drawing Sheets

BRAKE DEVICE

FIELD OF THE INVENTION

The present invention relates, in general, to railway type braking equipment and, more particularly, this invention relates to a brake device which is mounted on a railroad car and which produces a braking force by pressing brake shoes against the tread surfaces of respective wheels.

BACKGROUND OF THE INVENTION

Generally, as is quite well known in the passenger transit industry, railroad cars consist of both driven cars and undriven trailer cars. Both types of these cars include pairs of trucks. When traveling along a railroad track, these trucks can be effected via the peripheral surfaces (tread surfaces) of the wheels (4 wheels). Further, since the wheels provided for each respective car truck are closely installed to match the spacing between railroad tracks, there are restrictions, particularly in driving cars, on the space for installation of equipment that is required to be installed around the trucks. Specifically, motors, etc., constituting the drive sources for driving wheels and brake devices for braking the wheels.

Because of this, one system employed for current railroad car brake devices is a direct-acting type system in which, as described in the disclosure of Japanese Laid-open Patent Application No. 59-192666 and the disclosure of Japanese Utility Model Publication No. 4-4936, etc., the braking force is produced by pushing a brake shoe against the tread surface of each wheel. A brake device of this type is one in which the output of a brake cylinder, installed in a main body, is transmitted via a piston to a cylinder lever which extends in the main body's upward and downward direction and, with the output amplified by this cylinder lever, a sleeve rod and a push rod are caused to move towards a respective wheel, thereby producing a braking force by causing a brake shoe which is mounted on the front end of the push-rod to be pressed against the wheel. An air pressure source is used as the pressure source for actuating the brake cylinder.

However, with a conventional air pressure type direct-acting brake device in which a braking force for pushing a brake shoe against the tread surface of a respective wheel is produced by an air pressure source in this manner, there is the problem that many items of equipment such as piping for supplying air pressure to the brake cylinder, control valves for operating and controlling the air pressure and a compressor, etc., are required and the weight of the car is increased, and for a long time there has been a demand for a purely electrical brake device.

The brake device described in Japanese Laid-open Patent Application No. 2-266130 has been disclosed as such a purely electrical brake device. This brake device can be made to correspond to the direct-acting type brake device as described above. This purely electrical brake device is constituted by an energy storage element (coil spring), an energy supply unit (control motor) which supplies energy to the energy storage unit, a force transmission unit, movement conversion elements (spindle, ball nut) which convert rotary movement to movement in the axial direction of the force transmission unit, a drive sleeve which transmits rotary movement from the energy storage unit to the movement conversion elements, and clutch control elements (outer tightening spring, inner tightening spring) which are provided between the movement conversion elements.

This brake device is one in which, as the result of rotation of the energy supply unit, rotary movement (energy) stored in the energy storage element is transmitted from the drive sleeve to the movement conversion elements via the clutch control elements, and the movement conversion elements convert the rotary movement to axial movement, thereby causing the force transmission unit to move in a straight line and causing the brake to be applied.

However, when a conventional purely electrical brake device is made to correspond to a direct-acting type brake in a railroad car, certain problems as described hereinafter arise.

In recent railroad cars, because of demands for improvement in riding comfort, etc., axle support of the wheels of trucks is provided with the interposition of a pliant material, etc., and consequently, in a direct-acting type brake system in which a braking force is produced by pressing a brake shoe against the tread surface of a wheel, when the brake shoe is pressed against the tread surface, the pliant material, etc. is deformed by the pressing force and the wheel moves under the force of inertia. Also, at times of passage over joints of the railroad track, a reaction force going from the wheel to the brake device is produced.

Normally, in a purely electrical brake device, when a reaction force from a wheel is transmitted, since it goes via the force transmission unit—clutch control elements—drive sleeve, there is the problem that a locked state can be maintained by the clutch. Consequently, when the reaction force acts in this state, it is not possible to absorb it and so great force or stress is imposed on the force transmission unit and the movement conversion elements, etc., and there is a risk of this ultimately leading to breakage and/or damage of various parts.

The present invention has been devised in order to resolve these problems, and provide a brake device which, by rapidly absorbing and easing the reaction force which acts on a brake shoe, makes it possible to prevent breakage of or damage to various parts.

SUMMARY OF THE INVENTION

According to a first aspect, the present invention provides a brake device that includes an energy production unit and a force transmission unit which receives the drive force of the energy production unit and produces outputs by advancing and retreating. There is a clutch unit provided between the energy production unit and the force transmission unit which maintains the advance and retreat positions of the force transmission unit when outputs are produced. Such brake device further includes a brake shoe which produces a required braking force by being pressed against a wheel tread surface which is mounted at the front end of the force transmission unit. There is a guide structure provided, which permits such brake shoe to move in each of an advance and a retreat direction relative to the force transmission unit, between the force transmission unit and the brake shoe. This brake device further includes a buffer unit disposed in the guide structure. Such buffer unit urges the force transmission unit and the brake shoe in the directions of separation and, also, permits movement of the brake shoe in a withdrawal direction on transmission of a reaction force exceeding the maximum output of the force transmission unit.

Additionally, according to a second aspect of the present invention, there is provided a brake device that includes an energy production unit, a force transmission unit which receives the drive force of the energy production unit and produces outputs by advancing and retreating and a clutch unit which is disposed between the energy production unit and the force transmission unit. Such clutch unit maintains both the advance and retreat positions of the force transmission unit when outputs are produced. A gap portion is provided which permits relative advance and retreat movement of the force transmission unit with respect to the clutch unit. This gap portion is formed between the force transmission unit and the clutch unit. A buffer unit is provided in the gap portion which urges the force transmission unit towards the relative advance position and which allows movement of the force transmission unit to the retreat position on imposition of a reaction force exceeding the maximum output of the force transmission unit.

In a third aspect, the present invention provides a brake device having an energy production unit, in which the force transmission unit produces outputs by converting rotary movement to rectilinear movement and moving forwards and backwards, and the clutch unit transmits the drive force of the energy production unit in the direction of the rotary movement of the force transmission unit. An engagement section, which separates the clutch unit and the force transmission unit at the force transmission unit's relative advance position, is provided between the force transmission unit and the clutch unit.

In a fourth and final aspect, the present invention provides a brake device possessing an energy production unit, a force transmission unit, which receives the drive force of the energy production unit and produces outputs by advancing and retreating, and a clutch unit disposed between the energy production unit and the force transmission unit. Such clutch unit maintains advance and retreat positions of the force transmission unit when outputs are produced. A brake shoe is mounted at the front end of the wheel tread surface side of the transmission unit.

OBJECTS OF THE INVENTION

It is, therefore, one of the primary objects of the present invention to provide a brake device which prevents breakage and/or damage to parts of the braking device when a braking force is produced by pushing a brake shoe against the tread surface of a wheel, if the brake shoe is subjected to a reaction force that is greater than the value of the maximum output of a force transmission unit through the use of a guide structure and a buffer unit installed between the brake shoe and the force transmission unit.

Another object of the present invention is to provide a brake device which will absorb a reaction force that is greater than the maximum output of the force transmission unit by moving the force transmission unit in a withdrawal direction in a gap portion by an amount corresponding to the reaction force to which it had been subjected.

Still another object of the present invention is to provide a brake device such that if a reaction force greater than the maximum output of the force transmission unit is encountered it can be absorbed by a buffer unit as the force transmission unit is moved in the withdrawal direction in the gap portion and, after that, since the force transmission unit can be restored to the maximum output state by the buffer unit the brake shoe's functions are not adversely effected and breakage of and/or damage to various parts of the brake device is prevented, and in case of a reaction force less than the maximum output value, the reaction force is not absorbed by the gap portion and buffer unit and thus an increase in the requisite gap for the brake shoe is prevented.

In addition to the objects and advantages of the present invention which have been described above, various other objects and advantages of the brake device will become more readily apparent to those persons who are skilled in the relevant railway braking art from the following more detailed description of the invention, particularly, when such description is taken in conjunction with the attached drawing figures and with the appended claims.

DETAILED DESCRIPTION OF THE INVENTION

Figure 1:
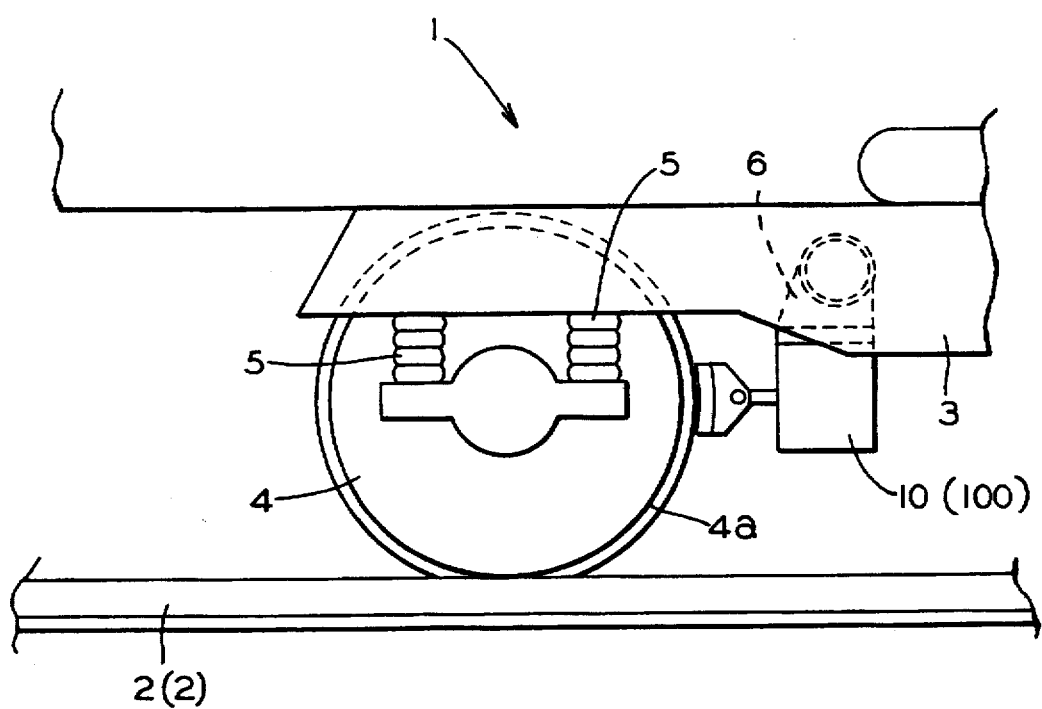
FIG. 1 is a side view for the purpose of describing the dispositional relations of a car and brake devices in accordance with a presently preferred embodiment of the invention.

Prior to proceeding with the more detailed description of the present invention it should be noted that, for the sake of clarity, identical components which have identical functions have been designated by identical reference numerals thoughout the several views illustrated in the drawings.

A brake device, generally designated 10, which constitutes one presently preferred embodiment of the invention will now be described with reference to the drawings. FIG. 1 is a side view for the purpose of describing the dispositional relations of a car 1 and brake devices 10 and FIG. 2 is a side view, partially in section, for the purpose of describing the structure of the brake device 10.

In FIG. 1, there is illustrated a driving car or a trailer car 1, which includes trucks 3 that travel along the tracks 2. Wheels 4 (although not shown, 4 wheels) are axially supported by a truck 3 in a manner permitting rotation. The peripheral surfaces (referred to below as the tread surfaces 4a) of these wheels 4 roll while in contact with the tracks 2. There are axle springs 5 which extend between a truck 3 and a wheel 4. A brake device 10, in this embodiment of the invention, produces a requisite braking force for stopping rotation of the wheel 4. Such braking device 10 is fixed to and supported by the wheel 4 via a support bracket 6.

Figure 2:
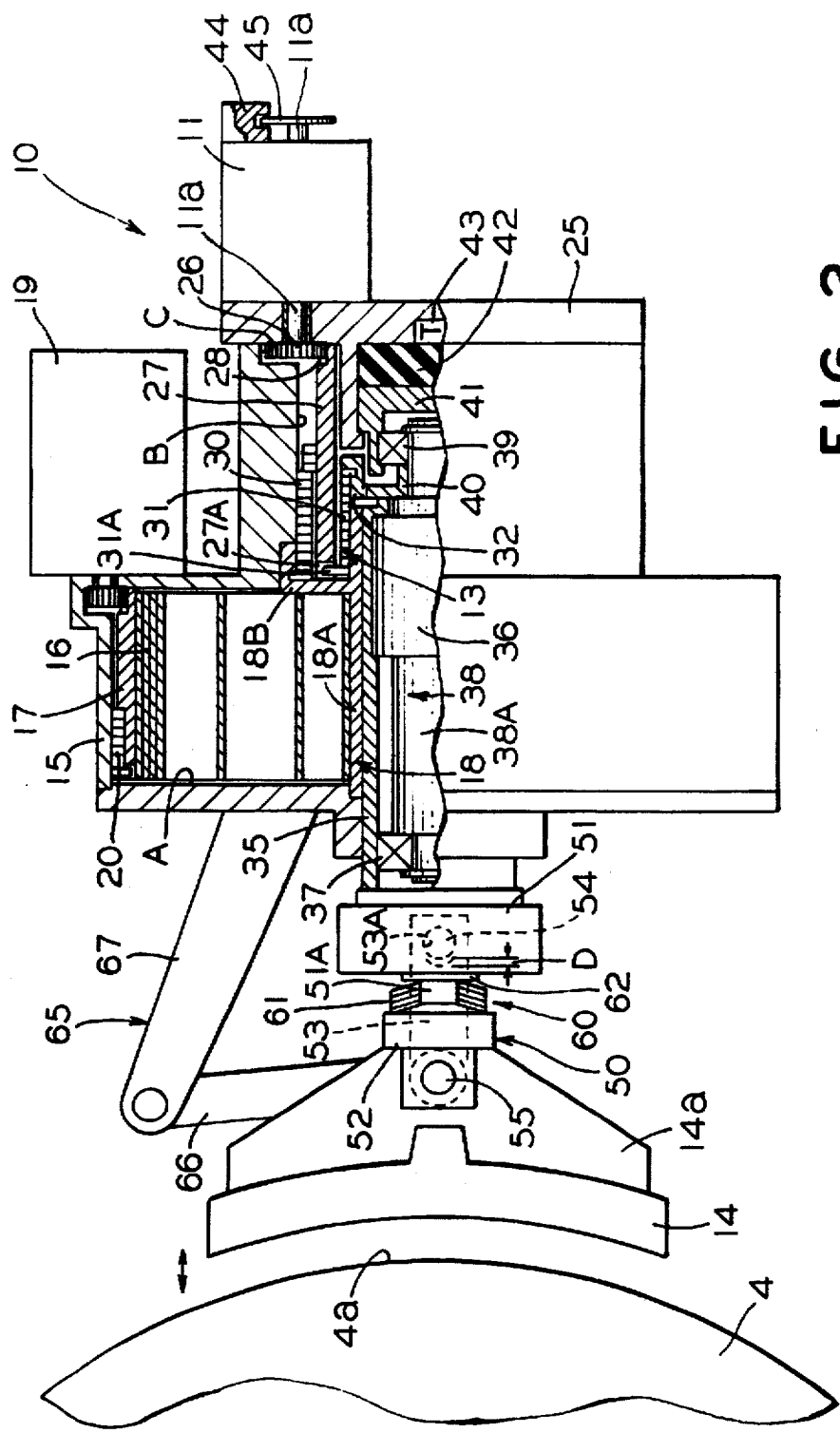
FIG. 2 is a side view, partially in section, for the purpose of describing the structure of the brake device in such presently preferred embodiment of the invention.

Reference is now made more particularly to FIG. 2. Illustrated therein are the details of the structure of the brake device 10. Such brake device 10 includes, as the principal components, a drive motor 11 constituting an energy production unit, a force transmission unit 12 that receives the drive force of the drive motor 11 and produces an output, a clutch unit 13 which, at times when the force transmission unit produces an output, maintains an advance or retreat position of the force transmission unit 12, and a brake shoe 14 which is pressed against the tread surface 4a of the wheel 4 and produces a braking force.

The brake unit 10 includes a brake housing 15. Inside such brake housing 15 there is formed an accommodation space A and a stepped hole in which a clutch hole B and a motor hole C are disposed in successive continuation. A strong coil spring 16 is accommodated and installed in the accommodation space A of the brake housing 15. The outer peripheral surface of such coil spring 16 is engaged by a sleeve 17 which is provided between it and the brake housing 15, while its inner peripheral surface encloses the accommodation space A and is engaged by a drive sleeve 18 which is held by the main body of the brake device 10. The sleeve 17 is engaged by a motor 19 attached to the brake housing 15 and it is allowed to rotate in only one direction by a tightening spring 20, which is provided between it and the brake housing 15, and it can tighten the coil spring 16. A cylindrical shaft portion 18A which extends along the accommodation hole A and the clutch hole B and a large diameter portion 18B which extends with its diameter increased at the motor hole C end are integrally formed in the drive sleeve 18.

The drive motor 11 is mounted via a structural lid 25 to the brake housing 15 into which the motor hole C opens. A gear 26 which is mounted on the front end of its drive shaft 11a engages gear ring 28 that is formed on the outer peripheral surface of a control sleeve 27 installed inside the clutch hole B.

There is a clutch unit 13 provided which extends over the inner surface and outer surface of this control sleeve 27. This clutch unit 13 includes, as principal components thereof, an outer tightening spring 30 (coil spring) which is disposed between the large diameter portion 18B of the drive sleeve 18 and the outer peripheral surface of the control sleeve 27 and an inner tightening spring 31 (coil spring) which is disposed between the cylindrical shaft portion 18A of the drive sleeve 18 and the inner peripheral surface of the control sleeve 27. One end of the outer tightening spring 30 is fixed to the control sleeve 27, and the outer peripheral surface of its other end portion is disposed such that it contacts the drive sleeve 18 and the inner peripheral surface of such brake housing 15 on the same axis. The inner peripheral surface of the inner tightening spring 31 is engaged by the outer peripheral surfaces of the cylindrical shaft portion 18A of the drive sleeve 18 and a drive ring 32 which is disposed on the same axis, and one end of this inner tightening spring 31 is fixed to the drive ring 32. A projecting end portion 31A which extends radially outward is formed at the other end of the inner tightening spring 31. This projecting end portion 31A is provided such that it acts cooperatively with a projection portion 27A formed at the accommodation space A end of the control sleeve 27. As a result, the clutch unit 13 possesses clutch functions with which rotation of the drive sleeve 18 in one certain direction is prevented by the outer tightening spring 30, and rotary movement in one direction is transmitted between the drive sleeve 18 and the drive ring 32 by the inner tightening spring 31.

In this embodiment of the invention, the force transmission unit 12 is disposed in a manner such that it will project from the accommodation space A side of such brake housing 15, and it is connected to a force transmission sleeve 35 which slidably penetrates the interior of the drive sleeve 18. The force transmission sleeve 35 is fixed to a ball nut 36, provided inside it, and is supported by a ball bearing 37. A spindle 38 is disposed inside the force transmission sleeve 35. The spindle 38 extends from the end of the force transmission unit 12 to a point below the drive ring 32 and is rotatably supported by the ball bearing 37 and by a ball bearing 39 provided inside the clutch hole B. A screw shaft portion 38A of such spindle 38 penetrates the ball nut 36 and is engaged with it by the interposition of plural balls (not shown). Further, the spindle 38 and the drive ring 32 are in a state of connection through a spline engagement of the drive ring 32 by a spindle ring 40 provided on the end of the spindle 38.

A cup element 41 fixedly supports the ball bearings 39, 42. There is a resilient disk 42 disposed between the cup element 41 and the brake housing 15. There is a pressure converter 43 provided inside the brake housing 15 that is in contact with the resilient disk 42. Additionally, a fixed yoke 44 is fixed to the drive motor 11. A disk 45, which functions cooperatively with the fixed yoke 44, is provided on the drive shaft 11a of the drive motor 11, and it has plural holes formed therein. Such disk 45 constitutes an encoder which controls rotation of the drive motor 11 as the result of these holes being counted by the fixed yoke 44.

The brake shoe 14 is mounted on such force transmission unit 12 via a guide structure, generally designated 50, and a buffer unit, generally designated 60, and is positioned at a set interval from the wheel 4. The guide structure 50 has as its main components a bearing block 51 which is fixed to the force transmission unit 12, a bearing block 52 which is fixed to the shoe head 14A of the brake shoe 14, and a guide plate section 53.

Connection shafts 54 and 55, which project radially outward, are respectively provided on the bearing block 51 and the bearing block 52. The guide plate section 53 is suspended between these two connection shafts 54 and 55. One end of the guide plate section 53 is fixed to the connection shaft 55, a long hole 53A formed at its other end fits in a manner permitting play on the connection shaft 54, and the guide plate section 53 is installed with a set gap D which is formed between it and the connection shaft 54 and which permits movement of such brake shoe 14 in the direction of an advance and a retreat of the force transmission unit 12.

The buffer unit 60, of the present invention, is constituted by stacking plural dish springs 61 having a generally V-shaped cross-section. Further, the buffer unit 60 is externally fitted via a washer 62 on a support shaft 51A which is provided on the bearing block 51 and projects towards the bearing block 52. Such buffer unit 60 is positioned such that it will extend between the bearing block 51 and the bearing block 52 and it imposes a spring force which acts in the directions of mutual separation of the brake shoe 14 and the force transmission unit 12 and which, when the brake shoe 14 is subjected to a reaction force exceeding the maximum output of the force transmission unit 12, allows the brake shoe 14 to move in a withdrawal direction. There is a guide link section 65 which consists of a pair of links 66 and 67. The link 66 is rotatably mounted on such connection shaft 55 of the bearing block 52 and the link 67 is fixed to the brake housing 15.

With respect to the brake device 10, of this embodiment the invention as described above, the action of easing of a reaction force from the wheel 4 in control and operation of the brake device 10 will now be described. For the convenience of such description, it is assumed that when the coil spring 16 is in a state in which it is pulled by the action of the motor 19 the motor 19 is prevented from turning in reverse by the tightening spring 20 and the drive sleeve 18 is subjected to a relatively large torque in one direction. It is also assumed that at normal times the drive sleeve 18 is fixed by such outer tightening spring 30 in a manner such that it cannot turn in one direction.

At the time the drive motor 11 is actuated and the control sleeve 27 is rotated, in order to apply the brake shoe 14 to the surface 4a on the wheel 4, the outer tightening spring 30 becomes tightened on the control sleeve 27, so that the inner diameter of such outer tightening spring 30 becomes smaller and it becomes possible to release the engagement of such outer tightening spring 30 and the drive sleeve 18, i.e., it becomes possible to rotate the outer tightening spring 30 in the direction opposite to the fixing direction. As a result, up until the time when the drive sleeve 18 is fixed to the brake housing 15 again by the outer tightening spring 30, the drive sleeve 18 can be freely rotated by the action of such coil spring 16.

Thus, the rotary movement of the drive sleeve 18 corresponds to the rotary movement of the control sleeve 27. Also, during this rotary movement, the projection portion 27A of the control sleeve 27 engages the projecting end portion 31A of the inner tightening spring 31, and the inner tightening spring 31 is turned in the direction in which its inner diameter is made smaller. Since, as a result, the inner tightening spring 31 is fixed and clamps the drive sleeve 18 and the drive ring 32, rotary movement, or torque, is transmitted to the drive ring 32 via the inner tightening spring 31.

The turning force being transmitted to the drive ring 32 is transmitted to the spindle 38 via the spindle ring 40 in spline engagement with the drive ring 32 as the spindle 38 rotates and since this turning force is converted to rectilinear force, because of the relationship between the spindle 3 and the ball nut 36 with which it is in screw engagement via plural balls, the ball nut 36, while guided by the spindle 38, is moved together with the force transmission sleeve 35 towards the wheel 4.

As a result, the brake shoe 14 mounted on the force transmission unit 12 via the guide structure 50 is moved and the gap located between it and the wheel 4 is gradually narrowed and, eventually, the brake shoe 14 is pressed against the tread surface 4a of the wheel 4, so as to produce a braking force and apply a brake onto such wheel 4. Then, when the pressure converter 43 detects that a set braking force has been reached, i.e., when it is detected that the resistance force in the spindle 38 which is transmitted to the pressure converter 43 via the cup element 41, the resilient disk 42, ball bearing 39, and spindle ring 40 has reached a set value, the drive motor 11 is stopped, and the braking force of the brake shoe 14 is held at a set value.

If, at this time, a reaction force resulting from the brake shoe 14 being pushed against the tread surface 4a of the wheel 4, particularly an impulsive reaction force which is greater than the maximum output of the force transmission unit 12 acts on the brake shoe 14, the brake shoe 14 is moved towards the brake housing 15, or, more specifically, towards the brake housing 15 in the direction of such brake shoe 14 advance and retreat. Such movement is by an amount which corresponds to the gap D located between the connection shaft 54 of the bearing block 51 of the guide structure 50 and the long hole 53A of the guide plate section 53 and since, during this movement, the buffer unit 60 (plural dish springs 61), which is installed so as to extend between the bearing block 51 and the bearing block 52 of the guide structure 50, is elastically deformed to a state in which it is compressed. In this manner, the impulsive reaction force is absorbed by this elastic deformation and the reaction force that is transmitted directly to the brake device 10 is eased.

Then, since this elastic deformation of the buffer unit 60 is terminated after easing of the reaction force by the buffer unit 60, the brake shoe 14 will be pressed against the tread surface 4a of the wheel 4 in a manner such that it has a set braking force. If the brake shoe 14 is subjected to a reaction force that is less than the maximum output of the force transmission unit 12, then, as described in connection with the prior art, the force goes via the force transmission 12—clutch unit 13—drive sleeve 18, etc., and finally is absorbed through wind-up counter to the turning force of the coil spring 16.

To release the brake shoe 14 from the wheel 4, the drive motor 11 is rotated in the direction opposite to that described above, and as a result of the spindle 38 being rotated in reverse, via the control sleeve 27, inner tightening spring 31 and drive ring 32, the ball nut 36 is moved in a straight line towards the cup element 41, and the brake shoe 14 is withdrawn until it is at a set interval from the tread surface 4a of the wheel 4.

Figure 3:
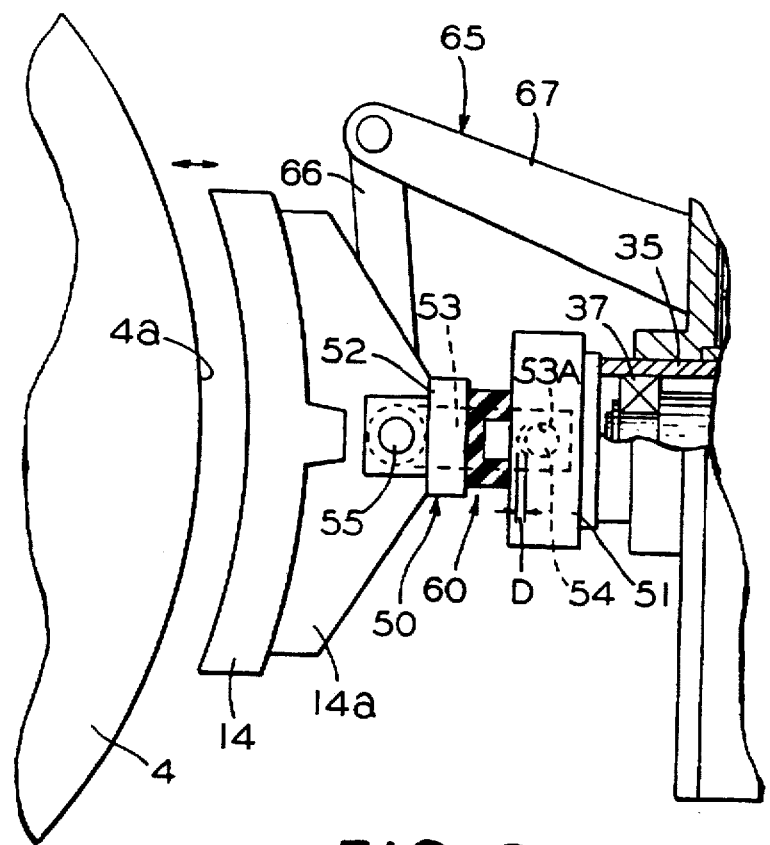
FIG. 3 is an enlarged view of principal parts which illustrates a modification of the brake device of the invention shown in FIGS. 1 and 2.

Although a unit constituted by plural dish springs 61 was described as the buffer unit 60 in the brake device 10 in this embodiment of the invention, it is not to be limited thereto or thereby. For example, this buffer unit 60 may also be a unit in which, as shown in FIG. 3, a cylindrical body produced from hard urethane rubber is interposed between the bearing block 51 and the bearing block 52, or it could be a unit which makes use of a normally employed hydraulic damper.

Thus, with the brake device 10 of embodiment, if, when a braking force is produced by pressing the brake shoe 14 against the tread surface 4a of the wheel 4, the brake shoe 14 is subjected to a reaction force that exceeds the value of the maximum output of the force transmission unit 12, then, due to the provision of the guide structure 50 and the buffer unit 60, which are easily installed between the brake shoe 14 and the force transmission unit 12, the brake shoe 14 is moved by the guide structure 50 so that it is withdrawn in the advance and retreat direction and the reaction force is absorbed by elastic deformation of the buffer unit 60.

Consequently, since direct transmission of the reaction force to the brake device 10 is eased, damage to and/or breakage of the various parts of the brake device 10 are prevented. While in the case of a reaction force which is less than the maximum output value, since there is no absorption by such guide structure 50 and the buffer unit 60, but absorption is effected by the coil spring 16, it is possible to prevent an increase of the requisite brake shoe 14 gap.

Figure 4B:
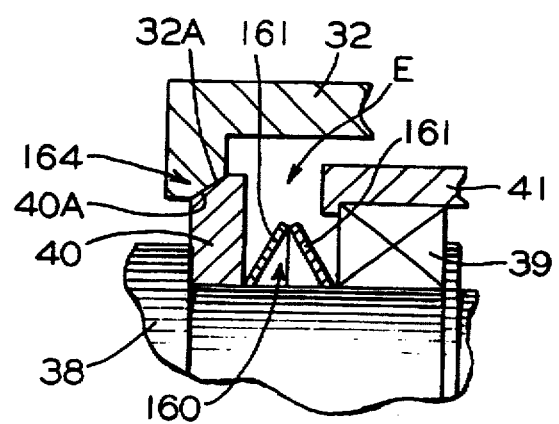
FIG. 4 are drawings for the purpose of describing the structure of a brake device according to an alternative embodiment of the invention, (a) is an overall side view partially in section, and (b) is an enlarged view of the principal parts.
Figure 4A:
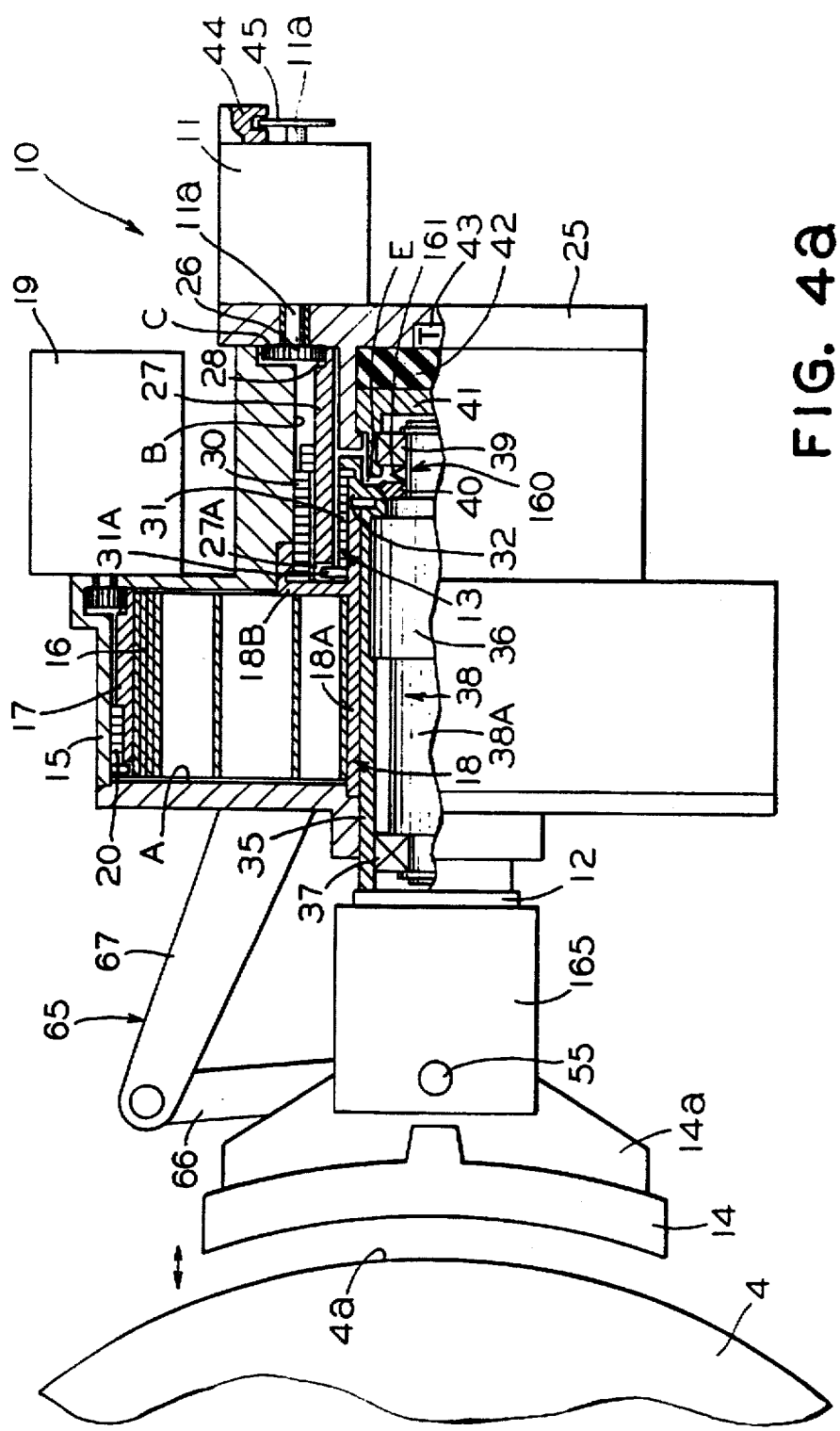

A brake device 100, which constitutes an alternative embodiment of the invention, will now be described with reference to the drawings. FIG. 4(a) is an overall side view, partially in section, for the purpose of describing the structure of the brake device 100 in this embodiment and FIG. 4(b) is an enlarged view of principal components of the brake device 100 in this embodiment. Components in FIG. 4 which are the same as corresponding components illustrated in FIGS. 1 and 2, as mentioned above, are given the same reference symbols, and a detailed description thereof has been omitted for the sake of brevity.

The brake device 100, in this embodiment of the invention, includes a function by which the wheel 4 reaction force is eased inside the brake housing 15 and it represents a modification of the above described embodiment.

In FIG. 4(a) and FIG. 4(b), a preset gap E is formed between the spindle ring 40 and the ball bearing 39. There is a buffer unit 160 provided in this gap E. This buffer unit 160 combines two dish springs 161 which have a V-shaped cross-section and it is formed to a rhombus cross-section. Each dish spring 161 is installed in the gap E in engagement with the spindle ring 40 and with the ball bearing 39. In this manner, this buffer unit 160 will impose on the spindle ring 40 (spindle 38) and such ball bearing 39 a spring force which acts in the directions of their mutual separation and which will allow the brake shoe 14 to move in the advance and retreat direction when it is subjected to a reaction force exceeding the maximum output of the force transmission unit 12.

The sloped surfaces 40A and 32A, constituting an engagement section 164, are respectively formed on the spindle ring 40 and the drive ring 32 and it is possible for the spindle ring 40 to come into contact with the drive ring 32 from the cup element 42 side, bringing its sloped surface 40A into engagement with the sloped surface 32A of the drive ring 32 and to move away. The brake shoe 14 is mounted directly onto the force transmission unit 12 via a mounting element 165.

With respect to the brake device 100, of this embodiment of the invention as described above, the action of easing of a reaction force from the wheel 4 in control and operation of the brake device 100 will now be described. Since control and operation of the brake device 100 in this embodiment are performed by the same procedure as for the brake device 10 of the embodiment described above, a detailed description thereof will be omitted.

As a result of actuation of the drive motor 11 to apply the brake shoe 14 onto the tread surface 4a of the wheel 4, the control sleeve 27 is rotated and as the result of transmission by the spring force of the buffer element 160 of a turning force, or torque, to the spindle, via the spindle ring 40 connected to the drive ring 32, and rotation thereof, the ball nut 36, while guided by the spindle 38, will move together with the force transmission sleeve 35 towards the wheel 14. As a result, the brake shoe 14 mounted on the force transmission unit 12 via the guide structure 50 is moved and the gap between it and the tread surface 4a of the wheel 4 gradually becomes narrower and, eventually, the brake shoe 14 is pressed against the tread surface 4a of the wheel 4 so as to produce a braking force, and after the brake has been applied on the wheel 4, the motor 11 is stopped and the braking force of the brake shoe 14 is kept at a set value.

If, at this point in time, a reaction force resulting from the brake shoe 14 being pushed against the tread surface 4a of the wheel 4, particularly, a reaction force which is greater than the maximum output of such force transmission unit 12 acts on such brake shoe 14, then, on transmission of this reaction force to the ball nut 36 via the force transmission unit 12 and force transmission sleeve 35, the ball nut 36, together with the spindle 38 in screw engagement therewith, moves very slightly in its withdrawal direction (towards the cup element 41), counter to the spring force of the dish springs 161 of the buffer unit 160.

As a result of this, the sloped surface 40A of the spindle ring 40 will move away from the sloped surface 32A of the drive ring 32 and the connection between the spindle ring 40 and the drive ring 32 ends, and, after this, as the ball nut 36, while rotating the spindle 38, moves in the withdrawal direction in the gap portion E, and the reaction force is absorbed by the buffer unit 160 provided in the gap portion E, so as to ease the reaction force that is being transmitted directly to the brake device 100. Then, after easing of the reaction force by the buffer unit 160, since the elastic deformation of such buffer unit 160 is ended, a spring force resulting from ending of this deformation acts on the spindle ring 40, and this spring force causes the sloped surface 40A of the spindle ring 40 to come into engagement with the sloped surface 32A of the drive ring 32, so as to connect the spindle ring 40 to the drive ring 32.

This makes it possible to perform an output action/output cancellation process for the brake shoe 14. If the brake shoe 14 is subjected to a reaction force that is less than the maximum output of the force transmission unit 12, as described in connection with the prior art, the force goes via the force transmission unit 12—clutch unit 13—drive sleeve 18, etc., and finally is absorbed through wind-up counter to the turning force of the coil spring 16.

Thus, with the brake device 100 according to this embodiment of the invention, if the brake shoe 14 is subjected to a reaction force that is greater than the maximum output of the force transmission unit 12 when a braking force is produced by pushing the brake shoe 14 against the tread surface 4a of the wheel 4, damage to and/or breakage of various components of the brake device 100 can be prevented. This is possible because the ball nut 36, together with the spindle 38 in screw engagement therewith, will move in its withdrawal direction (towards the cup element 41), counter to the spring force of the dish springs 161 of the buffer unit 160.

Additionally, the sloped surface 40A of the spindle ring 40 moves away from the sloped surface 32A of the drive ring 32 and the connection between the spindle ring 40 and the drive ring 32 ends and, after this, as the ball nut 36, while rotating the spindle 38, moves in the withdrawal direction in the gap portion E, the reaction force is absorbed by such buffer unit 160 provided in the gap portion E, so as to ease the reaction force that is being transmitted directly to the brake device 100.

While in the case of a reaction force that is less than the maximum output value, an increase in the requisite gap for the brake shoe 14 can be prevented, since there is no absorption by the gap portion E and the buffer unit 160, but absorption is effected by the coil spring 16.

Even though the brake device 100, in this embodiment of the invention, is simply one in which a gap portion E is provided between such spindle ring 40 and the ball bearing 39 and the spindle ring 40 is brought into spline engagement with the drive ring 32, if the brake shoe 14 is subjected to a reaction force that is greater than the maximum output of the force transmission unit 12, this reaction force can be easily absorbed, since the ball nut 36 and spindle 38, etc. can move in the withdrawal direction.

It should therefore be readily apparent that the present invention provides a brake device which when a reaction force greater than the maximum output of the force transmission unit acts on the brake shoe which is pressed against a wheel tread surface and produces a braking force, the brake shoe is moved by the guide structure in the withdrawal direction and the reaction force is absorbed by the buffer unit. In the case of a reaction force that is less than the maximum output value, there is no absorption by the buffer unit and an increase in the brake shoe's requisite gap can be prevented.

Also, when a reaction force greater than the maximum output of the force transmission unit acts, the force transmission unit is moved in the withdrawal direction inside the gap portion and the reaction force is absorbed by the buffer unit and, after that, the force transmission unit can be restored to the maximum output state by the buffer unit. In the case of a reaction force that is less than the maximum output value, there is no absorption by the buffer unit and an increase in the force transmission unit's requisite gap can be prevented.

Further, since the force transmission unit produces outputs through conversion of rotary movement to rectilinear movement and advance and retreat movements, the clutch unit transmits the drive force of the energy production in the direction of rotation of the force transmission unit and an engagement section which separates the clutch unit and the force transmission unit at the position of relative advance of the force transmission unit is provided between the force transmission unit and the clutch unit, when a reaction force is imposed, the clutch unit is disengaged, and the force transmission unit is allowed to move a necessary amount in the withdrawal direction without being restrained by the clutch.

Thus, according to the brake device of the invention, when a braking force is produced by pushing a brake shoe against the tread surface of a wheel, if the brake shoe is subjected to a reaction force that is greater than the value of the maximum output of a force transmission unit, the brake shoe's functions are not harmed and breakage of and/or damage to various parts of the brake device can be prevented due to the provision of a guide structure and a buffer unit which are easily installed between the brake shoe and the force transmission unit, the brake shoe is moved away in a withdrawal direction, the reaction force is absorbed through elastic deformation of the buffer unit and direct transmission of the reaction force to the cylinder device is prevented and, after that, force resulting from ending of the elastic deformation of the buffer unit presses the brake shoe against the wheel's tread surface with a set braking force and in the case of a reaction force that is less than the maximum output value, there is no absorption by the guide structure and buffer unit, and an increase in the requisite gap for the brake shoe is prevented.

Also, when a reaction force greater than the maximum output of the force transmission unit acts, breakage of and/or damage to various parts of the brake device can be prevented, since the reaction force can be absorbed by moving the force transmission unit in a withdrawal direction in a gap portion by an amount corresponding to the reaction force to which it has been subjected.

Further, if a reaction force greater than the maximum output of the force transmission unit acts, it can be absorbed by a buffer unit as the force transmission unit is moved in the withdrawal direction in the gap portion and, after that, since the force transmission unit can be restored to a maximum output state by the buffer unit, the brake shoe's functions are not harmed and breakage of and/or damage to various parts of the brake device is prevented and in the case of a reaction force that is less than the maximum output value, the reaction force is not absorbed by the gap portion and buffer unit and an increase in the requisite gap for the brake shoe is prevented.

It will be understood that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiments shown and described, but should be accorded the full scope and protection of the appended claims.

We claim:

1. A brake device for a railway vehicle, said brake device comprising;
   (a) an energy production means for supplying a drive force;
   (b) a force transmission means connected to receive said drive force of said energy production means for producing outputs by advancing and retreating;
   (c) a clutch means disposed between said energy production means and said force transmission means for maintaining an advance and a retreat position of said force transmission means when said outputs are produced;
   (d) a brake head in which a brake shoe which produces a braking force by being pressed against a wheel tread surface is mounted at a front end of said force transmission means;
   (e) a guide means disposed between said force transmission means and said brake shoe for enabling said brake shoe to move in an advance and a retreat direction relative to said force transmission means; and
   (f) a buffer means disposed in said guide structure for urging said force transmission means and said brake shoe in directions of separation and for enabling movement of said brake shoe in a withdrawal direction upon transmission of a reaction force exceeding a maximum output of said force transmission means.

2. A brake device for a railway vehicle, said brake device comprising;
   (a) an energy production means for supplying a drive force,
   (b) a force transmission means connected to receive said drive force of said energy production means for producing outputs by advancing and retreating,
   (c) a clutch means disposed between said energy production means and said force transmission means for maintaining an advance and retreat position of said force transmission means when said outputs are produced,
   (d) a gap portion formed between said force transmission means and said clutch means for enabling relative advance and retreat movement of said force transmission means with respect to said clutch means, and
   (e) a buffer means disposed in said gap portion for urging said force transmission means towards a relative advance position for enabling movement of said force transmission means to a retreat position on imposition of a reaction force exceeding a maximum output of said force transmission means.

3. A brake device, as claimed in claim 2, wherein said force transmission means includes a means for converting rotary movement to rectilinear movement.

4. A brake device, as claimed in claim 3, wherein said force transmission means further includes a means for moving forwards and backwards.

5. A brake device, as claimed in claim 2, wherein said clutch means transmits said drive force of said energy production means in a direction of rotary movement of said force transmission means.

6. A brake device, as claimed in claim 2, wherein said brake device further includes an engagement section disposed between said force transmission means and said clutch means for separating said clutch means and said force transmission means at said force transmission mean's relative advance position.

7. A brake device, as claimed in claim 2, wherein a brake shoe is mounted at a front end of a wheel tread surface side of said force transmission means.

8. A brake device, as claimed in claim 1, wherein said energy production means for supplying said drive force is a motor.

9. A brake device, as claimed in claim 8, wherein said motor is an electric motor.

10. A brake device, as claimed in claim 2, wherein said energy production means for supplying said drive force is a motor.

11. A brake device, as claimed in claim 10, wherein said motor is an electric motor.

12. A brake device, as claimed in claim 1, wherein said buffer means disposed in said guide structure is a spring.

13. A brake device, as claimed in claim 12, wherein said spring includes a plurality of dish springs.

14. A brake device, as claimed in claim 13, wherein each of said dish springs have a substantially V-shaped cross section.

15. A brake device, as claimed in claim 1, wherein said buffer means disposed in said guide structure is a cylindrical body of hard urethane rubber.

16. A brake device, as claimed in claim 2, wherein said buffer means disposed in said gap portion is a spring.

17. A brake device, as claimed in claim 16, wherein said spring includes a plurality of dish springs.

18. A brake device, as claimed in claim 17, wherein said plurality of dish springs have a substantially V-shaped cross section.

19. A brake device, as claimed in claim 1, wherein said guide means disposed between said force transmission means and said brake shoe includes a set gap for enabling said brake shoe to move in an advance and a retreat direction relative to said force transmission means.

20. A brake device, as claimed in claim 1, wherein said buffer means includes a hydraulic damper.

* * * * *